United States Patent [19]

Elsener et al.

[11] 4,049,615
[45] Sept. 20, 1977

[54] PROCESS FOR THE DISTORTION-FREE COLORATION OF POLYOLEFINS WITH ORGANIC PIGMENTS

[75] Inventors: Anton Elsener, Birsfelden; Hans Harald Gehrt, Therwil; Bernhard Medinger, Aesch; Volkhard Wiese, Pratteln, all of Switzerland

[73] Assignee: Ciba-Geigy Corporation, Ardsley, N.Y.

[21] Appl. No.: 659,440

[22] Filed: Feb. 19, 1976

Related U.S. Application Data

[63] Continuation of Ser. No. 489,222, July 17, 1974, abandoned.

[30] Foreign Application Priority Data

July 30, 1973 Switzerland .................. 11052/73

[51] Int. Cl.$^2$ .............................................. C08K 9/04
[52] U.S. Cl. ............................ 260/39 P; 260/42.16; 260/42.21

[58] Field of Search ................ 260/42.21, 39 P, 42.16

[56] References Cited

U.S. PATENT DOCUMENTS

| 2,197,442 | 4/1940 | Widmer ........................... 260/39 P |
| 2,525,835 | 10/1950 | Schmutzler et al. .......... 260/39 P X |

OTHER PUBLICATIONS

J. E. Simpson, "Coloring Plastics, "*Modern Plastics Ency.*, vol. 42, No. 1A, p. 417 (1965).

A&E Rose, *Condensed Chemical Dictionary*, 5th ed., (1961), p. 997.

*Primary Examiner*—Sandra M. Person
*Attorney, Agent, or Firm*—Vincent J. Cavalieri

[57] ABSTRACT

A process for the distortion-free dope coloration of polyolefins with organic pigments, wherein the organic pigment is coated with a melamine-formaldehyde resin which is then cured.

4 Claims, No Drawings

PROCESS FOR THE DISTORTION-FREE COLORATION OF POLYOLEFINS WITH ORGANIC PIGMENTS

This is a continuation of application Ser. No. 489,222, filed on July 17, 1974, now abandoned.

In the colouration of polyolefins, especially of polyethylene, with organic pigments, it is frequently observed that, in the course of time, a number of the mechanical properties of the coloured material undergo change: faults occur that are known collectively as distortion phenomena. In injection moulded parts of large bulk, e.g. bottle crates, made from polyethylene of high density it is possible, for example, to observe deformations and shrinkages which sometimes lead to cracking and as a rule make the articles unfit for use. An embrittlement often also occurs after a relatively short period of use. These disadvantages are attributable to the majority of organic pigments, whereas the inorganic pigments and a small number of organic pigments are neutral in their effect. The causes of these negative phenomena are still largely unknown, but it is assumed that the presence of the pigments upsets the typical crystallisation behaviour of the polyolefins.

The present invention is based on the observation that it is possible to colour polyolefins with organic pigments without causing distortion by coating said pigments with a resin which is insoluble in the substrates and which does not melt at the respective processing temperatures. By coating the organic pigments with such a resin, the direct influence of the pigments on the substrates to be coloured is inhibited. A particularly suitable resin according to the invention is a melamine-formaldehyde resin which is cured after the coating. Typical organic pigments which are particularly suitable for the process according to the invention are: perylene and perinone pigments and, in particular, bisazo and isoindolinone pigments.

In the manufacture of the pigment preparations using melamine-formaldehyde resins, it has proved advantageous to carry out the curing of the coating in the presence of a protective colloid, for example the sodium salt of carboxymethyl cellulose. It is also advisable to use an efficient stirring and dispersing device so as to prevent as far as possible a heavy agglomeration of the pigment particles coated with the initially still tacky resin. The procedure to be followed desirably consists in manufacturing the resin precondensate separately and then adding this to the pigment suspension. The resin precondensate is then cured at temperatures of preferably 80° C to 100° C.

The cured pigment preparations should not be subjected to any very severe mechanical influences, for example those exerted by a grinding process, since otherwise the brittle coating can be damaged or rubbed off from the surface of the pigments. The incorporation of the pigment preparations is effected by the conventional known methods in extruder devices at temperatures in the melting range.

The advantage of the process according to the invention is that it is possible to colour polyolefins with organic pigments of high purity which have hitherto been unsuitable for this purpose. It is furthermore surprising that it is possible to coat the surface of the pigments with the melamine-formaldehyde resin so easily and completely and that the coating adheres so well under the normal mechanical stress exerted by the extruder.

The test of the distortion effects induced in polyolefin by a pigment coated with a melamin-formaldehyde resin is carried out on an injection moulded finished part which, in form and dimensions, is shaped to conform with the requirements of practice as closely as possible. A test specimen which is characterised by its wheel shape with defined differences in layer thicknesses and having an internal stress have proved particularly suitable for this test.

The test specimen is inserted on one side into a clamp and subjected to a constant spring pressure. A measuring pin which is firmly held in position is then lowered down onto the specimen and the point of contact is determined. The deviation of the test specimen from the horizontal can be read off direct on a dial gauge with an accuracy of 0.01 mm. In the Example, the distortion of polyethylene HD without pigment, of polyethylene with untreated pigment and polyethylene with melamine-formaldehyde coated pigment is reported after 7 days and after a 72 hour heat treatment at 100° C.

Practical experiments were also carried out with a large screw injection moulding machine (Kraus-Maffei KM V 110) of bottle crate form. The polyethylene of high density was coloured dry with the pigment by mixing in a Nauta mixer and processed under the usual conditions. In contrast to the bottle crates coloured with untreated pigment, the crates coloured with coated pigment exhibit no distortion and withstood the usual tests for durability.

EXAMPLE 1

An aqueous press cake of a red pigment of the formula

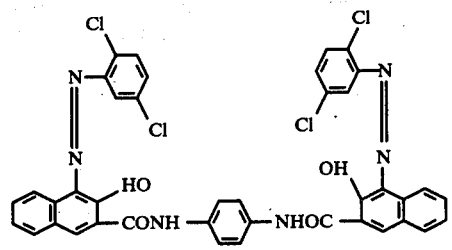

containing 40.0 g of pigment, is dispersed in 600 ml of water with the aid of a high-speed toothed disc impeller. To the suspension are added 1.2 g of the sodium salt of a carboxymethyl cellulose the 1% aqueous solution of which has a viscosity of at least 1300 cP.

The highly fluid pigment suspension is conveyed to a heatable reaction vessel which is equipped with reflux cooler, thermometer, dropping funnel, pH measuring electrode and a high-speed impeller. The suspension is heated to 90°-92° C and the pH is adjusted to 6.0 by addition of dilute sulphuric acid.

In the meantime, the resin precondensate is prepared in a separate procedure as follows:

A mixture of 10.9 g of a 30% by weight aqueous formaldehyde solution and 0.11 g of a 50% by weight aqueous solution of monoethanolamine phosphate is prepared and the pH of this mixture is adjusted to 6.0 by addition of 2 normal sodium hydroxide solution. With stirring, 3.45 g of melamine are added, the batch is heated to 60° C and condensation is effected over the course of 30 minutes at this temperature after all the melamine has dissolved. Immediately afterwards, the resulting transparent precondensate is diluted with 20 ml of water and added dropwise with vigorous stirring over the course of 5 minutes to the ready prepared pigment suspension. The pH is kept at 6.0 and the temperature is not permitted to fall below 90° C. The mixture is allowed to continue to react for 16 hours at 90°–92° C and pH 6.0. The pH of the reaction mixture is then raised to about 9.5 and then 290 ml of a 0.1 normal aqueous solution of the sodium salt of a resin acid (e.g. abietic acid) are added. After about 15 minutes the pH is adjusted to 4.0 by the dropwise addition of dilute sulphuric acid and the free resin acid is thereby precipitated. Finally, the precipitate is filtered off with suction, washed free of acid with water and dried to constant weight 75°–80° C, to yield 52 g of a powder which contains 75% of pigment, 8.25% of melamine-formaldehyde resin and 16.75% of resin acid (e.g. abietic acid) and which is suitable for colouring injection moulded parts of large bulk made from polyolefins.

The following distortion values were measured:

| Material | Distortion (in mm) after 7 days | after 72 hrs. at 100° C |
| --- | --- | --- |
| Stamylan 9400 colourless (polyethylene HD, Staatsmijnen, Holland) | 10.61 | 16.23 |
| Stamylan 9400 coloured with 0.2% of untreated pigment | 17.51 | 27.81 |
| Stamylan 9400 coloured with 0.267% of melamine-formaldehyde resin coated pigment | 8.32 | 13.88 |

EXAMPLE 2

The following ingredients are put successively into a heatable reaction vessel which is equipped with reflux cooler, dropping funnel, pH measuring electrode and a high-speed impeller: 20 g of a red pigment of the formula

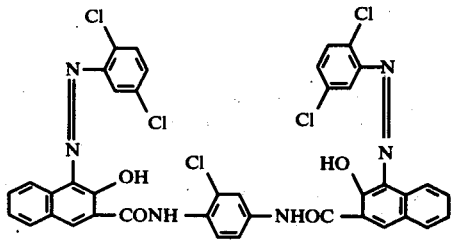

as aqueous press cake, 0.6 g of the sodium salt of a carboxymethyl cellulose which in 1% aqueous solution has a viscosity of at least 1300 cP, and 650 ml of water. The mixture is stirred and heated to 90°–92° C.

In the meantime, the resin precondensate is prepared in a separate procedure as follows:

A mixture is prepared of 12 g of a 30% by weight aqueous formaldehyde solution and 0.12 g of a 50% by weight aqueous solution of monoethanolamine phosphate and this mixture is then adjusted to pH 6.0 by addition of 2 normal sodium hydroxide solution. With stirring, 3.75 g of melamine are added, the mixture is heated to 60° C and condensation is performed over the course of 30 minutes at this temperature after all the melamine has dissolved.

Immediately afterwards, the resulting transparent precondensate is diluted with 25 ml of water and added dropwise over the course of 10 minutes to the ready prepared pigment suspension. The pH is kept at 6.0 and the temperature is not permitted to fall below 90° C. The mixture is allowed to continue to react for 16 hours at 90°–95° C and at pH 6.0 and then cooled to room temperature. The precipitate is collected by suction filtration, washed with water and dried to constant weight at 75°–80° C, to yield 22 g of a powder containing 80% by weight of pigment which is very suitable for colouring injection moulded parts of large bulk made from polyolefins.

The following distortion values were measured:

| Material | Distortion (in mm) after 7 days | after 72 hrs. at 100° C |
| --- | --- | --- |
| Vestolan A 6016 colourless (polyethylene HD, Chemische Werke, Huls) | 9.77 | 14.97 |
| Vestolan A 6016 coloured with 0.2% of untreated starting pigment | 17.56 | 28.73 |
| Vestolan A 6016 coloured with 0.25% of melamine-formaldehyde resin coated pigment | 11.87 | 18.84 |

EXAMPLE 3

In a laboratory sand mill, 20 g of the yellow pigment {bis-[4,5,6,7-tetrachloroisoindolin-3-on-1-ylidene]-phenylenediamine(1,4)} are deagglomerated with the addition of 175 ml of water and 0.6 g of the sodium salt of a carbomethoxy cellulose which in 1% by weight of aqueous solution has a viscosity of at least 1300 cP. The resulting pigment suspension is quantitatively separated from the sand washed (with a total of about 300 ml of water) and conveyed to a heatable reaction vessel which is equipped with reflux cooler, thermometer, dropping funnel, pH measuring electrode and a high-speed impeller.

The suspension is heated to 90°–92° C and the pH is adjusted to 6.0 by appropriate addition of dilute sulphuric acid. In the meantime, the resin precondensate is prepared in a separate procedure as follows:

A mixture is prepared of 48 g of a 30% by weight aqueous formaldehyde solution and 0.48 g of a 50% by weight solution of monoethanolamine phosphate and this mixture is adjusted to a pH of 6.0 by addition of 2 normal sodium hydroxide solution. With stirring, 15.5 g of melamine are added, the mixture is heated to 60° C and condensation is performed over the course of 30 minutes at this temperature after all the melamine has dissolved.

Immediately afterwards, the resulting transparent precondensate solution is diluted with 85 ml of water and added dropwise over the course of 25 minutes to the ready prepared, vigorously stirred pigment suspension. The pH is kept at 6.0 and the temperature is not permitted to fall below 90° C. The mixture is allowed to continue to react for 16 hours at 90°–95° C and pH 6.0 after it has cooled to room temperature, the precipitate is collected by suction filtration, washed with water and dried to constant weight at 75°–80° C, to yield 38 g of a soft powder containing 50% by weight of pigment which is very suitable for colouring injection moulded parts of large bulk made from polyolefins.

The following distortion values were measured:

| Material | Distortion (in mm) after 7 days | after 72 hrs. at 100° C |
| --- | --- | --- |
| Vestolan A 6016 colourless | 7.18 | 10.86 |

-continued

| Material | Distortion (in mm) after 7 days | after 72 hrs. at 100° C |
|---|---|---|
| (polyethylene HD, Chemische Werke, Huls) | | |
| Vestolan A 6016 coloured with 0.2% of untreated starting pigment | 10.13 | 16.06 |
| Vestolan A 6016 coloured with 0.4% of melamine-formaldehyde resin coated pigment | 8.14 | 12.51 |

EXAMPLE 4

In a laboratory glass ball mill, 20 g of a red pigment of the formula

are deagglomerated with the addition of 1300 ml of water and 0.6 g of the sodium salt of a carboxymethyl cellulose the 1% aqueous solution of which has a viscosity of at least 1300 cP. The resulting pigment suspension is quantitatively separated from the glass balls (washed with about 350 ml of water) and conveyed to a heatable reaction vessel which is equipped with reflux cooler, thermometer, dropping funnel, pH measuring electrode and a high-speed impeller. The suspension is heated to 90°-92° C and the pH is adjusted to 6.0 by appropriate addition of dilute sulphuric acid. In the meantime, the resin precondensate is prepared in a separate procedure in the following manner:

A mixture of 4.7 g of a 35% by weight aqueous formaldehyde solution and 0.054 g of a 50% by weight aqueous solution of monoethanolamine phosphate is prepared. The pH of this solution is adjusted to 6.0 by addition of 2 normal sodium hydroxide solution. With stirring, 1.71 g of melamine are added, the mixture is heated to 60° C and condensation is carried out over the course of 30 minutes at this temperature after all the melamine has dissolved.

Immediately afterwards, the resulting transparent precondensate is diluted with 10 ml of water and then added dropwise over the course of 10 minutes to the ready prepared and vigorously stirred pigment suspension. The pH is kept at 6.0 and the temperature is not permitted to fall below 90° C. The mixture is allowed to continue to react for 16 hours at 90°-95° C and at pH 6.0. The pH of the reaction mixture is then raised to 9.5 and 146 ml of a 0.1 normal aqueous solution of the sodium salt of a resin acid (e.g. abietic acid) are added. After about 15 minutes, the pH is adjusted to 4.0 by the dropwise addition of dilute sulphuric acid and the free acid is thereby precipitated. Finally, the precipitate is collected by suction filtration and dried to constant weight at 75°-80° C, to yield 24.5 g of a powder that contains 75% by weight of pigment and is suitable for colouring injection moulded parts of large bulk made from polyolefins.

EXAMPLE 5

An orange pigment of the following formula

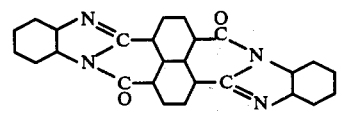

is used instead of the red pigment in Example 4. By otherwise carrying out in every detail the procedure as described in Example 4 there are obtained 24.5 g of a powder that contains 75% by weight of pigment and is suitable for the colouration of injection moulded parts of large bulk made from polyolefins.

We claim:

1. In the process for preparing shaped, distortion-free dope colored high density polyethylene or polypropylene with organic pigments, the improvement comprising using an organic pigment which is coated with a cured melamine-formaldehyde resin.

2. A process according to claim 1, wherein the organic pigment is coated with 5% to 50% by weight of resin based on the weight of the preparation.

3. A process according to claim 1, wherein the resin is cured in the presence of a protective colloid.

4. A process according to claim 1, wherein the resin is cured in the presence of the sodium salt of carboxymethyl cellulose.

* * * * *